(12) United States Patent
Castro et al.

(10) Patent No.: US 7,325,007 B2
(45) Date of Patent: Jan. 29, 2008

(54) SYSTEM AND METHOD FOR SUPPORTING NON-NATIVE DATA TYPES IN A DATABASE API

(75) Inventors: Pablo Castro, Bellevue, WA (US); Blaine Dockter, Duvall, WA (US); Kawarjit Singh Bedi, Sammamish, WA (US); Ramachandran Venkatesh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 365 days.

(21) Appl. No.: 11/074,951

(22) Filed: Mar. 7, 2005

(65) Prior Publication Data
US 2006/0200486 A1    Sep. 7, 2006

(51) Int. Cl.
*G06F 17/30* (2006.01)
(52) U.S. Cl. .................. 707/102; 707/104.1; 707/101; 717/114; 717/116

(58) Field of Classification Search ................ 701/102; 707/101, 102, 104.01; 717/114, 116
See application file for complete search history.

(56) References Cited

U.S. PATENT DOCUMENTS 6,643,652 B2* 11/2003 Helgeson et al. ............. 707/10
2004/0128400 A1* 7/2004 Srinivasan et al. ......... 709/250

OTHER PUBLICATIONS

U.S. Appl. No. 10/775,282, filed Feb. 10, 2004, Venkatesh et al.

* cited by examiner

*Primary Examiner*—E. J. Kennedy
(74) *Attorney, Agent, or Firm*—Woodcock Washburn LLP

(57) ABSTRACT

A database API is presented that can expose data of non-native data-types, i.e., types that are unknown at API design-time. A broad type-system is used that is understood by both a server and a client. The API can dynamically discover, at run-time, data types that were defined using this broad type-system. The API can retrieve metadata that references a non-native data type in a client type library. A retrieved instance of the non-native data type, in serialized form, may be deserialized using the metadata.

14 Claims, 6 Drawing Sheets

```
[Serializable]
[SqlUserDefinedType(Format.Native)]
public struct Point : INullable
{
  protected int _x;
  protected int _y;

public Point( int x, int y ) {
    _x=x;
    _y=y;
  } public int X {
    get { return _x; }
    set { _x=value; }
  } public int Y {
    get { return _y; }
    set { _y=value; }
  }

// INullable implementation and other UDT required methods
}
```

Fig. 4

```
CREATE TABLE Points (
  id INT PRIMARY KEY,
  p Point
)
```

Fig. 5

```
// assume "conn" is an open connection

// create a command and execute it
SqlCommand cmd=new SqlCommand("SELECT id, p FROM Points",
conn);
SqlDataReader reader=cmd.ExecuteReader();

// interate through the results
while(reader.Read()) {
  // get the value for a regular int column
  int id=reaget.GetInt32();

// now get the UDT
  Point p=(Point)reader[1];

// print out some info
  Console.WriteLine("id={0}, point={1},{2}", id, p.X, p.Y);
}

// clean up...
```

Fig. 6

```
// create a command and execute it
SqlCommand cmd=new SqlCommand"SELECT id, p FROM Points",
conn);
SqlDataReader reader=cmd.ExecuteReader();

// interate through the results
while(reader.Read()) {
  // get the value for a regular int column
  int id=reaget.GetInt32();

// now get the UDT raw bytes
  byte[] buffer=new byte[32]; // need to know size or read in
chunks
  int read=r.GetBytes( 1, 0, buffer, 0, 32 );

// alternatively the user can call GetSqlBytes and get all
the
  // contents in a single operation // print out some info
  string s=string.Format("id={0}, point=", id);
  for(int i=0; i < read; i++)
    s+=i.ToString("x"); // print each byte in hex
}

// clean up...
```

Fig. 7

```
// create a command with a parametrized query
// (same thing for stored-procs with parameters)
SqlCommand cmd=new SqlCommand(
                         "INSERT INTO Points VALUES (@id,
@pt)", conn );

SqlParameter param;

// add a regular INT parameter
param=cmd.Parameters.Add( "@id", SqlDbType.Int );
param.Value=1;

// add a UDT parameter
param=cmd.Parameters.Add( "@pt", SqlDbType.Udt );
param.UdtTypeName="demodb.dbo.Point";
param.Value=new Point( 2, 4 );

// execute the command
cmd.ExecuteNonQuery();

// clean up...
```

Fig. 8

SYSTEM AND METHOD FOR SUPPORTING NON-NATIVE DATA TYPES IN A DATABASE API

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2005, Microsoft Corp.

FIELD OF THE INVENTION

This invention generally relates to databases, and more particularly to an application programming interface (API) for accessing database services.

BACKGROUND OF THE INVENTION

A database can store data of many different types. For example, a database may store strings, such as strings of characters representing words, as well as integers, such as the number 876. A number of other standard data types exist.

Data types may also be more complex. For example, imagine a useful data type for describing circles. Such a data type might include a graphical location for a circle center, for example, an x-y coordinate value, and a radius length in centimeters. Extrapolating from this example, one can imagine an infinite number of potentially useful data types. There can be data types for describing shapes of any kind, buildings, cars, roads, weather patterns, songs, and so forth.

A data type may correspond to an object that provides a particular function. An object is a self-contained functional unit of software. For example, an object may draw circles. Any computer program may call the circle-drawing object and request it to draw a particular circle. The circle-drawing object may require data that is stored as a particular data type, such as the type described above. Once the object is given an instance of data of the proper type, it can draw the circle.

Unconventional data types are increasingly supported by major database server software vendors. As a result, the traditional relational model for storing data in databases has been increasingly supplemented by object-relational data storage features that support user defined and/or otherwise unconventional data types. It has also become much more common to use object-oriented-based technologies in the presentation-tier and middle-tier.

Database application programming interfaces (APIs), unfortunately, have not kept pace with the increased flexibility in data storage. An application programming interface ("API") is a computer process or mechanism that allows other processes to work together. A database API allows processes to make calls to a database to invoke database services. The API is thus a group of functional services. The actual code behind an API is located in a collection of dynamic link libraries ("DLLs").

Present data-access APIs deal with closed type systems, and as such cannot support newly formulated data types. All data types supported by the back-end are statically known at the time the API is designed. Thus, there is a mismatch between databases that are capable of flexible storage of newly formulated data types on behalf of object-oriented technologies, and database APIs that cannot effectively recognize and support such new data types. Non-native data types may be, for example, user-defined types (UDTs) as they are described in U.S. patent application Ser. No. 10/775,282.

Modern database software such as MICROSOFT SQL SERVER®, IBM DB2®, ORACLE DATABASE®, and SYBASE IQ® provide APIs. The vast majority of enterprise applications today use databases, and therefore also use the APIs that allow applications to access and manipulate those databases. It is desirable to provide these applications, whether client-side, middle-tier, or server-side applications, with the most responsive and scalable database API possible. This is especially true for data access-intensive applications.

In light of the forgoing deficiencies, there is an unaddressed need in the industry to provide an improved database API, in particular, one that can support non-native data types.

SUMMARY OF THE INVENTION

A database API is presented that can expose data of non-native data-types, i.e., types that are unknown at API design-time. A broad type-system is used that is understood by both a server and a client. The API can dynamically discover, at run-time, data types that were defined using this broad type-system. The API can retrieve metadata that references non-native data types in a type library. A retrieved instance of the non-native data type, in serialized form, may be deserialized using the metadata. Additional aspects of the invention are explained in detail below.

BRIEF DESCRIPTION OF THE DRAWINGS

FIG. 4 illustrates an exemplary user defined type, "point," for the purpose of discussing the various features of the invention.

FIG. 5 provides a table "points" for the purpose of the examples in the specification.

FIG. 6 illustrates execution of a SELECT statement or a stored-procedure to get SqlDataReader back. The UDT columns can be exposed as actual instances of UDT types to a client, accessible through an exemplary GetValue method or a class indexer ([ ] in C#).

FIG. 7 illustrates how embodiments of the invention can provide for binding UDTs as bytes.

FIG. 8 illustrates the use of UDTs as parameters. Statements can include parameters of UDT type. UDT parameters may be set up as any other parameter, with the addition of one new piece of information: the UDT type as known to the server.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Figure 1:
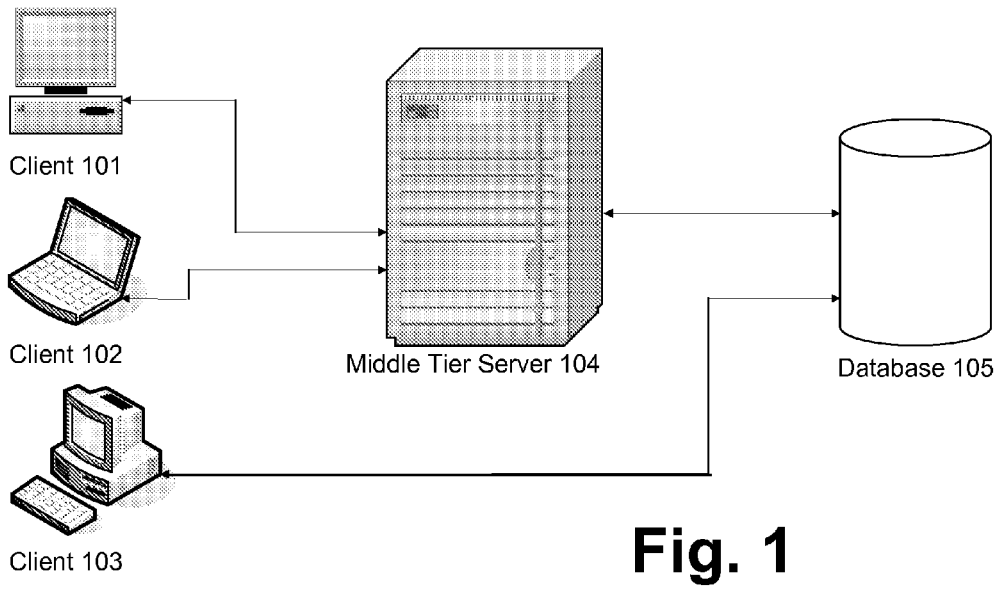
FIG. 1 illustrates a database that is operably connected with client devices and a middle-tier server.

Referring to FIG. 1, the systems and methods of the invention can be implemented in an environment in which one ore more clients 101, 102, and 103 access a database 105. Clients 101, 102, and 103 may access database 105 through one or more middle-tier servers such as 104, or may access the database 105 directly, as illustrated with respect to client 103. An API that implements aspects of the invention could execute operations on a client, e.g., 101, 102, or 103, a server 104, or database 105. In a distributed computing arrangement, software functionality such as an API can actually execute on a number of cooperating devices. Thus, the API provided herein can execute on any of the devices illustrated in FIG. 1, or on any combination of those devices working in unison.

Figure 3:
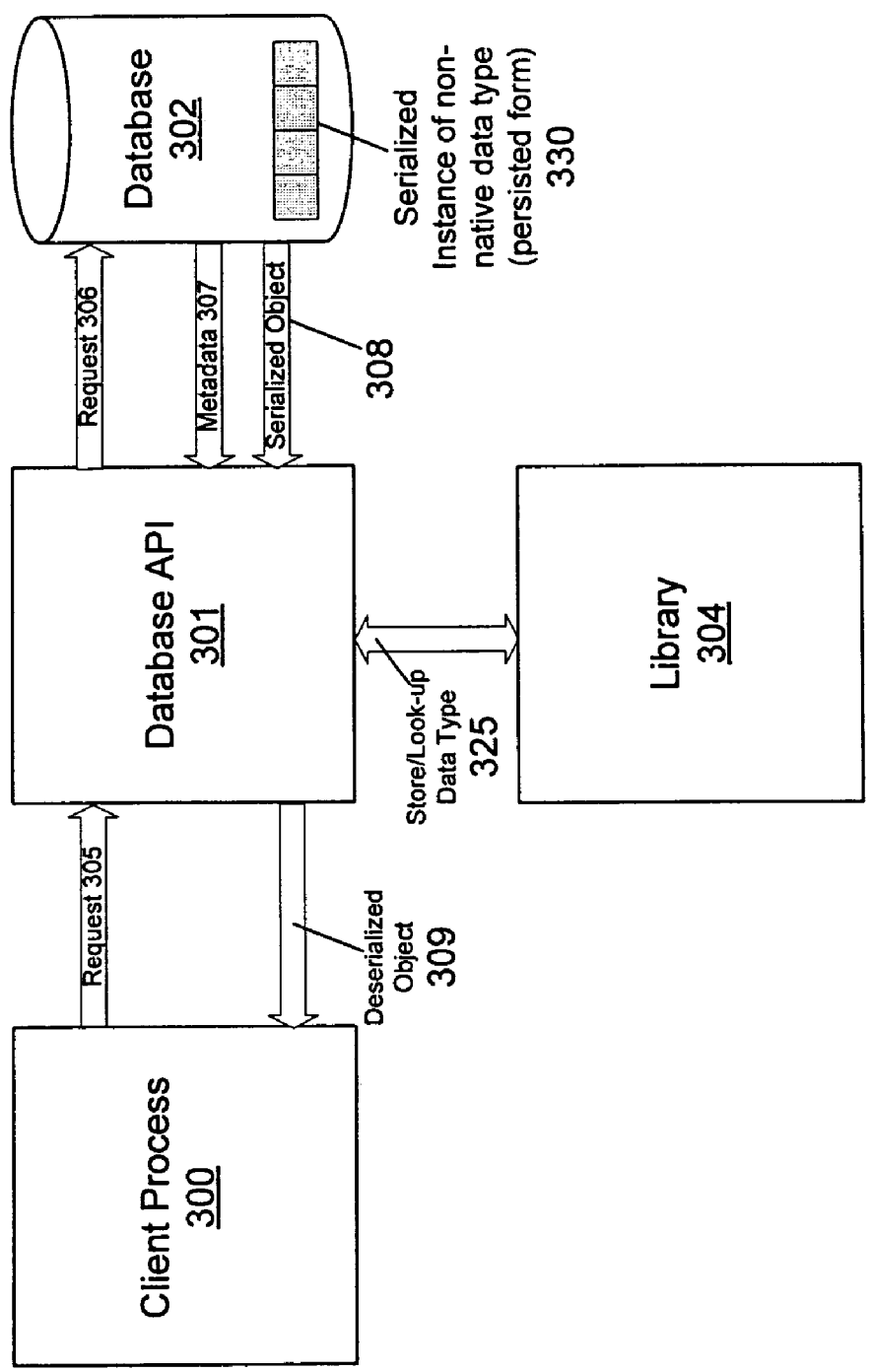
FIG. 3 illustrates a client process that requests data of a non-native type from a database. The API is able to support a client process requests by retrieving metadata along with a serialized object, and deserializing the object according to information stored in a library and referenced by the metadata.

A database 105 is a collection of data, typically describing the activities of one or more related organizations. For example, a university database might contain information about entities, such as students, faculty, courses, and classrooms, and relationships between entities, such as student enrollment in courses, faculty teaching courses, and the use of rooms for courses. A database management system, or DBMS, is software designed to assist in maintaining and utilizing large collections of data. For the purpose of this document, however, the term "database," or "database server" refers to either or both of a collection of data and DBMS software. Thus, database 105 in FIG. 1, and 302 in FIG. 3 illustrate database servers comprising both collections of data and DBMS. Further distinction will be made when necessary.

Many kinds of databases are in use. The first database model is widely attributed to Charles Bachman of General Electric in the early 1960's. This was called the Integrated Data Store, and followed the network data model. Later in the 1960's, IBM developed the Information Management System, which formed the basis for a hierarchical data model. In 1970, Edgar Codd of IBM proposed the relational data model, which proved to be a watershed in the development of database systems. The popularity of relational databases changed the commercial landscape. Their benefits were widely recognized, and the use of databases for managing corporate data became standard practice. While relational databases are the dominant model in use today, the various aspects of the invention are suitable for use in connection with any database presently in use or later developed that is capable of storing data of a plurality of data types. As described in the background section, this is particularly advantageous in the context of object-oriented data storage.

Various DBMS products, e.g., MICROSOFT SQL SERVER®, IBM DB2®, ORACLE DATABASE®, and SYBASE IQ® have greatly extended the capabilities of databases. Databases can store a wide variety of data types, such as images and text, and can perform complex queries on stored data. Specialized systems have been developed by numerous vendors for creating data warehouses, consolidating data from several databases, and for carrying out specialized analysis. All such products and database configurations are suitable for use in connection with the systems and methods herein.

Databases have entered the internet age. The use of a database to store data accessed through a web browser is widespread. Queries are generated through Web-accessible forms and answers are formatted using a markup language such as Hyper Text Markup Language (HTML) or Extensible Markup Language (XML) which can be displayed in a browser. Databases continue to gain importance as more and more data is brought online and made ever more accessible through computer networking. Today the field is being driven by exciting visions such as multimedia databases, interactive video, streaming data, digital libraries, a host of scientific projects, and corporate data consolidation and data mining. Where access to databases over global computer networks is commonplace, it should be clear that the systems and methods provided herein can be used regardless of the distance or type of connection between a client 101, 102, 103 and a database 105.

Database 105 may contain data of any kind, and may contain both data types that are operable with the invention, by conforming to the broader type-system described herein, and data types that may not conform to such a type system and which are not operable with the invention. Database 105 may contain, for example, bank account data, songs, a book catalogue, electronic books, scientific information, archived weather and oceanographic information. The data that may be stored on database 105 is as diverse as the scope of human interests. Any such data may conform to a data type. A data type may range from standard types, such as strings and integers, to custom user-defined types that are used only by a specialized group of users.

When a middle-tier server 104 is used to process client 101, 102 requests, the arrangement is known in the industry as a three-tier system—therefore server 104 is referred to in FIG. 1 as a middle tier server 104. The middle tier server 104 is an intermediary between client computers 101, 102, and 103 and database 105. In today's network environments, the number of client 101, 102, and 103 requests that require database services may be at one time very small, and at another time enormous. Thus, it is desirable to design a system such as that of FIG. 1 to be highly scalable, allowing the system to fluctuate efficiently between few and many client 101, 102, and 103 demands. A middle-tier server can assist in scalability of a database service.

A computing device such as 101, 102, 103, 104, and 105 typically includes at least some form of computer readable media. Computer readable media can be any available media that can be accessed by a computing device. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

Figure 2:
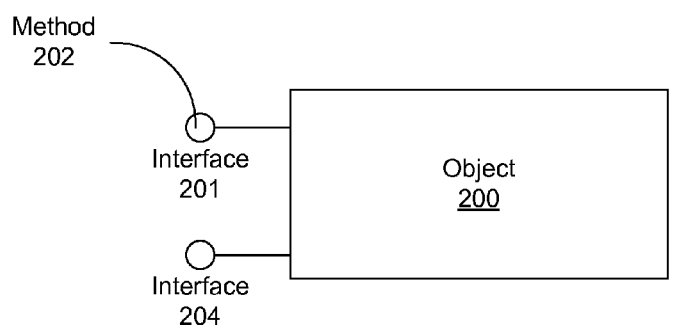
FIG. 2 illustrates an object with interfaces and methods.

Referring to FIG. 2, the API provided herein may be embodied as one or more objects 200. Object 200 is a discrete unit of software typically generated using object-oriented programming techniques. There are several different types of objects, depending on the particular programming technique that is used, and the API provided here may be implemented using any such technique. COM objects typically support multiple interfaces 201, 204, but other object types are available and widely used in the industry, and the object 200 described here is intended as a nonlimiting example for the purpose of illustration.

Objects such as 200 generally support one or more interfaces 201, 204, each of which may include methods. A method 202 is typically a function or a procedure that performs a specific action and can be called by software, e.g., another object which may form part of a client process. Such software is referred to as the client of object 200. Thus, the term client, as that term is used here, does not necessarily refer to a complete device, but rather refers to an entity that makes a request of another entity.

The methods 202 that make up an interface 201 are usually related to each other in some way. In general, clients can access the services provided by an object 200 by invoking the methods 202 in the object's interfaces 201, 204. Clients are generally prohibited from accessing an object's data. It should be noted that functions described herein and in the claims as accomplished by an object 200 may also be achieved through multiple objects designed to interface with each other.

Typically, an object 200 is an instance of a specific class. One class, for example, might contain objects that provide services for opening a connection to a database server, while another class might contain objects for writing data to a file. Typically, a programmer knows an object's class prior to running an instance of that object.

The class of an object is looked up in a class library (not shown). Such a class library has access to a directory of all available classes of objects. A client can call a function in a library specifying the class of object it wants and the first supported interface to which it wants a pointer. The library then causes a server that implements an object of that class to start running. The library also passes back to the initiating client a pointer to the requested interface on the newly instantiated object. The client can then ask the object directly for pointers to any other interfaces the object supports.

Interfaces supported by objects are generally thought of as a contract between the object and its clients. The object promises to support the interface's methods as the interface defines them, and the clients promise to invoke the methods correctly. Thus, an object and the clients must agree on a way to explicitly identify each interface, a common way to describe, or define, the methods in an interface, and a concrete definition of how to implement an interface.

Thus, objects can be described in terms of the interface parameters that they inherit, as well as the class parameters that they inherit. Where a class of objects has a function for writing data to a file, for example, an instance that inherits the class will also be able to write data to a file, as well as any additional features and functions provided in the instance. Where a class supports a particular interface, an instance of the class inherits the "contract" and therefore also supports the interface.

The objects through which aspects of the invention are implemented generally conform to these programming principles and understandings of the definitions for objects, classes, and interfaces. However, it should be clear that modifications and improvements to object-oriented programming techniques are constantly occurring, and the invention is not limited to objects of a particular type or with any specific features. The API provided can be implemented through objects of any kind now in use or later developed.

Referring to FIG. 3, the API 301 provided herein may expose non-native data types such as 330 to a client process 300. A non-native data type 330 is one that is not natively recognized by API 301. The form of the non-native data type 330 used for description of the invention herein is the user-defined type (UDT). Other forms may be available for non-native data types 330 that may be exposed using the invention. Additionally, it should be understood that The Structured Query Language (SQL) standard uses the term "user-defined type" (UDT) to describe several forms of data type extensibility. For example, there are the "SQL-99 Distinct Types" and the "SQL-99 Structured Types."

SQL-99 Distinct Types include a distinct type D that is a user-defined type whose internal representation is a value of an existing SQL built-in data type B. A type D may optionally share comparison and arithmetic operators, type conversions, and aggregate (column) functions (e.g., max, min, average) with type B. Type D may allow constraints to be defined on its values. In addition, type D may expose behaviors beyond those of B by defining new functions specific to D via user-defined functions. With respect to type checking, D and B are considered to be different types.

The main advantage of distinct types is ease of definition. If the internal representation of the new type has a single data member that can be described with an existing built-in type and the built-in type already implements most of the behaviors required on the new type, then distinct types are an attractive alternative. The user does not have to worry about implementing the behaviors required to manage the on-disk storage of the type, constructors, comparison operators (used for ordering and indexing), arithmetic operators, and type conversion (casting) operators. The user only needs to choose what functionality of the underlying built-in type should be exposed on the distinct type and optionally add constraints on values or additional functions on the new type. Another advantage is that all of the query processing machinery available for built-in types such as computation of histograms can be readily used on columns of distinct types.

SQL-99 Structured Types are user-defined types whose internal representation is a collection of data members, each of which may be of a different SQL built-in or user defined type. This is similar to the notion of a struct in C/C++. SQL-99 has a style for defining structured types by which a user need only define the type in terms of its internal structure (similar to the specification in CREATE TABLE). The system automatically generates accessor and mutator functions on its data members, constructor, and functions to manage the on-disk representation of instances of the type. The main advantages of structured types as defined in SQL are ease of definition of basic behaviors of the type, and flexibility to define more complex types. The disadvantage is complexity of definition of type-specific methods, which are usually defined via external functions written in a general-purpose programming language like C/C++. In order to define a structured type fully, the definer of the type needs to straddle a line between SQL and some other programming language. The various non-limiting examples of data types are provided above not as an exhaustive list, but rather to emphasize that numerous forms are available for UDTs, and that the invention may be operable with non-native data types of any kind, including all of the various different forms available for UDTs.

Client process 300 may be any process that requests a database 302 service. A process 300 is an instance of an application. Every process 300 has at least one thread, the main thread, but can have many. In this regard, the client process 300 may comprise the operation of one or more threads. Each thread represents an independent execution mechanism. Any code that runs within an application runs via a thread. In a typical arrangement, each process is allotted its own virtual memory address space by an operating system. All threads within the process share this virtual memory space. Multiple threads that modify the same resource must synchronize access to the resource in order to prevent erratic behavior and possible access violations. In this regard, each thread in a process gets its own set of volatile registers. A volatile register is the software equivalent of a CPU register. In order to allow a thread to maintain a context that is independent of other threads, each thread gets its own set of volatile registers that are used to save and restore hardware registers. These volatile registers are copied to/from the CPU registers every time the thread is scheduled/unscheduled to run by a typical operating system.

In addition to the set of volatile registers that represent a processor state, typical threads also maintain a stack for executing in kernel mode, a stack for executing in user mode, a thread local storage ("TLS") area, a unique identifier known as a thread ID, and, optionally, a security context. The TLS area, registers, and thread stacks are collectively known as a thread's context. Data about the thread's context must be stored and accessible by a processor that is executing a thread, so that the processor can schedule and execute operations for the thread. Process 300, executing in this context, may request the services of API 301.

API 301 receives a request 305 from process 300 for some database 302 service. In the scenario addressed by the exemplary embodiments discussed herein, the request 305 comprises a request for a UDT 330. UDT support in a data access API 301 comprises of a set of object methods and properties that expose UDTs 330 to client processes 300. UDT 330 support in API 301 may also comprise an internal infrastructure that supports UDT 330 serialization, instantiation and description of UDT 330 metadata.

In an exemplary SQL SERVER® implementation, UDTs 330 are defined using a broad type system. A broad type system is a system that can prescribe rules for the naming, description, and/or format of data types such that information about such data types can be gleaned by an entity, such as API 301, that does not natively support the data type. An example of a broad type system is the Common Language Runtime (CLR) types.

The CLR is a core component of the NET Framework that defines, among other things, a type-system and provides a type description and handling infrastructure. The use of the CLR allows use of a representation of the type-system using an existing infrastructure. This implies that existing programming languages, compilers and tools targeting the CLR can be leveraged. Thus, while an existing broad type system such as the CLR is convenient because it allows re-use of existing know-how of the NET Framework, other broad type systems could be used in accordance with the techniques provided here.

Thus, in one embodiment of the invention, a request 306 for a UDT is sent from API 301 to database 302. In response, the database 302 can send metadata 307 and a serialized object 308. The metadata 307 can reference information about the serialized object 308 that is stored in library 304. API may then use metadata 307 to look up 325 information in the library 304. Using this information, the serialized object 308 can be deserialized and provided (as shown by 309) to client process 300.

A UDT 330 is actually a CLR type, either a reference-type or a value-type (a "class" or a "struct" respectively, using C# terms). Not all CLR types are UDTs; UDTs 330 are CLR types that meet a specific contract to handle type-conversion, serialization and other UDT-specific aspects.

The deployment unit for CLR types is the "assembly", which is typically a single "dll" or "exe" file, although technically it can be composed of several files. Assemblies that contain UDTs are "dll". An assembly can contain one or more UDTs, along with other unrelated types.

Embodiments of the invention can be conveniently described in terms of the extensions it provides to existing data access APIs. The data-access API that is included in the .NET Framework, for example, comprises of a set of classes that are collectively called the "ADO.NET" API. This API can been extended to support UDTs 330 in accordance with the techniques provided herein. As a result of such extensions, the ADO.NET user will be able to fully exploit the functionality of the UDT. UDT columns can appear as objects in the DataReader. Users can also use an object as a Parameter value. To accomplish this, certain modifications can be made to the ADO.NET SqlClient component. It will be recognized that corresponding changes can be made to other database APIs to implement the invention in other contexts.

The exemplary extensions described below assume the existence of a class called "Point" which is a UDT properly registered in a server. The exemplary "Point" class can look roughly like the example in FIG. 4. The "point" class is merely an example of a UDT and is not intended to limit the scope of potential data types that may be used with the invention. Additionally, the examples below assume a table "Points" defined as illustrated in FIG. 5.

Referring to FIG. 6, assume a user has a table in a server that has one or more UDT columns. The client computer may have an assembly containing the UDT locally installed. The user may execute a SELECT statement or a stored-procedure and get a SqlDataReader back. The UDT columns can be exposed as actual instances of the UDT types to the client, accessible through the GetValue method or the class indexer ([ ] in C#).

Referring to FIG. 7, embodiments can provide for binding UDTs as bytes. If a user does not want to create an instance of a UDT, e.g., because the type is not available locally, or because the user does not want to run UDT code on the client, a different accessor method may be used to access the UDT value in the data reader. This method need not instantiate the UDT.

FIG. 8 illustrates the use of UDTs as parameters. Statements can include parameters of UDT type. UDT parameters may be set up as any other parameter, with the addition of one new piece of information: the UDT type as known to the server. This can be, for example, the 3-part name.

The database API extensions available to support UDTs in can correspond to the extensions for SqlClient listed below. The exemplary extensions provided here are a SqlDataReader class, a DataSet class, a SqlMetaData class, a SqlParameter class, and a SqlResultSet class. Aspects of the invention comprise providing the functionality of one or more of the classes described with reference to the ADO-.NET extensions below.

SqlDataReader Class

SqlDataReader is the class that can represent the result of a query. It can be extended to provide functionality for accessing values as will as additional metadata. With regard to accessing values, the user can use specific methods in this class, such as GetValue, to access the value of a given column for the current row. Other implementations may access the value in other ways, such as through a dedicated method for this purpose, as appreciated by those of skill. When the column is of a user-defined type, the value returned by the accessor methods is an actual object of the type defined by the user; so from the user perspective objects that are selected in the server are brought down to the client. If the data-type defined by the user in the database server is not available to the client then object-accessors are not available and will fail, but the caller can still obtain a raw byte-representation of the type.

With regard to metadata, SqlDataReader can provide metadata-access APIs that allow callers to discover the contents of the readers, including the type and other facets of individual columns, at run-time, without knowledge of the query that produced the results. Specifically, the GetSchemaTable method can be used to obtain a description of all the columns in the result-set, and GetFieldType can be used to specifically obtain the data-type of a given column. Both of these methods have been extended to support handling user-defined types that are unknown at the time of the construction of the API. They will return proper type information that is obtained from the server. If the type is available to the client that is, if the containing assembly is accessible to the calling AppDomain, then additional information will be available to the callers, including the System.Type instance that represents the type defined by the user.

In some designs, metadata may be highly dependent on the assembly containing the types described by metadata being present and available to the calling application. An improved design can use the CLR syntax for assembly-qualified type names that allow a full description of type-names without having to return System.Type objects.

A first exemplary method in the SqlDataReader class is GetDataTypeName. This can be expressed as follows:
public string GetDataTypeName(int index)

When called on a UDT column, the GetDataTypeName method may return the 3-part name of the UDT. The GetDataTypeName method may throw an IndexOutOfBoundsException if "index" is less than 0 or greater than the number of columns in the result-set minus 1.

A second exemplary method in the SqlDataReader class is GetFieldType. This can be expressed as follows:
public Type GetFieldType(int index)

When called on a UDT column, this method may return a System.Type instance that represents the UDT type in the CLR type-system, or null if the type is not available on the client.

A third exemplary method in the SqlDataReader class is GetSqlMetadata. This can be expressed as follows:
public SqlMetaData GetSqlMetaData(int index)

This method may return metadata for the indicated column. It can work for all types. When used in UDTs, it can return a SqlMetaData instance that includes information about the UDT. The GetSqlMetadata method may have the following exemplary properties:

Method Parameters:
index: column number, 0-based

Return Value:
A SqlMetaData instance that describes the column

Throws:
IndexOutOfBoundsException: if "index" is less than 0 or greater than the number of columns in the result-set minus 1.

Fourth, the GetValue, GetSqlValue, GetValues, GetSqlValues, and Indexer methods can be modified. These methods may be expressed as follows:
public object GetValue(int index )
public object GetSqlValue(int index)
public int GetValues( object[ ] values)
public int GetSqlValues( object[ ] values)
public object this[int index]
public object this[string columnName]

These methods may be modified so they can also return UDTs. When called on a UDT column, these methods can create a new UDT instance off the buffered bytes and return it to the caller. Note that the created object need not be cached inside SqlClient, so each call can result in a newly created instance. These methods may have the following exemplary properties:

Method Parameters:
index: column number, 0-based
columnName: the name of the column to get the UDT from Return Value:
A UDT instance. If the value is null, all these methods but GetSqlValue and GetSqlValues return DBNull.Value. GetSqlValue and GetSqlValues return the null instance of the UDT type (the value of the <udt>.Null property)

Throws:
IndexOutOfBoundsException: if "index" is less than 0 or greater than the number of columns in the result-set minus 1.
SerializationException [new]: if the serialization library fails to deserialize the UDT instance DataSet Class DataSet may be extended to create the effect of a disconnected stack. Embodiments can extend a class such as DataSet to support handling of UDTs. In particular, it can handle columns of arbitrary types, and support change-tracking interfaces that types can optionally implement better change-tracking support.

The adapter can exchange instances of UDTs between the DataSet and the connected stack (data-reader and parameters). In some designs, integrated support for UDTs in the DataSet may be omitted. Other implementations may support value-type change tracking automatically, and reference-types through a tracking interface (IChangeTracking). This allows UDTs to integrate with the optimistic-locking infrastructure of ADO.NET.

SqlMetaData Class

This class may be used to represent metadata for a column or parameter. It may be restricted to only 1 field that is UDT-specific. It may comprise a UdtTypeName property, expressed for example as follows:

public string UdtTypeName {get; }

This property may contain the 3-part name of a UDT as it is defined in the server.

SqlParameter Class

An exemplary SqlParameter class can provide value handling and metadata. With regard to value handling, parameter values can handle user-defined type instances. The "Value" property of the SqlParameter class may accept instances of UDTs, and during command execution these UDTs may be sent to the server along with the appropriate metadata. For output parameters, UDT instances sent by the server will be returned from the Value property after command execution.

With regard to metadata, the parameters may contain metadata to describe the single value that they represent. In the case of UDTs, parameters can have new metadata support that allows users to indicate the "sysname" of the UDT (that is, the UDT name as defined in the database namespace, which is different from the CLR type namespace).

This class may be used to represent metadata for a column or parameter. It may be restricted to only 1 field that is UDT-specific. It may have .ctor—SqlParameter Constructors, expressed as follows:

```
public SqlParameter(string parameterName,
    SqlDbType dbType,
    int size,
    ParameterDirection direction,
    bool isNullable,
    byte precision,
    byte scale,
    string sourceColumn,
    DataRowVersion sourceVersion,
    object value,
    int offset,
    SqlCompareOptions compareInfo,
    int localeId,
    string databaseName,
    string schemaName,
    string udtTypeName)
``` public SqlParameter(SqlMetaData meta)

The first constructor may include a UDT type name in the parameter list. If SqlDbType is Udt then UdtTypeName should be non-null. If SqlDbType is anything else, UdtTypeName should be null.

The second constructor may take a SqlMetaData instance that fully describes the parameter. If the parameter will be of a UDT type, the SqlMetaData object should include the UDT type name.

A MetaData property may be expressed as follows:

public SqlMetaData MetaData {get; set;}

This property can provide access to a SqlMetaData instance that describes metadata for this parameter. SqlMetaData may be invariant, so in order to change a value on it, a new SqlMetaData instance can be created and assigned to the parameter object.

A SqlDbType property can be expressed as follows:

Public SqlDBType SqlDbType {get; set;}

This property can be modified so it will accept SqlDbType.Udt as valid value. This property may work in conjunction with UdtTypeName. The table below summarizes the different potential combinations.

| SqlType | UdtTypeName | Value | Description |
| --- | --- | --- | --- |
| Native Type | Not Set (nor required) | Value of Native type | Current case. No change. Error if UdtTypeName is specified. |
| Native Type | Not Set (nor required) | Non-Native | If the value implements IConvertible, convert the value to the specified "Native" type. If not supported, error. Error in case UdtTypeName is set. Setting value to a UDT is not valid in this case if it does not support IConvertible. User should try to explicitly extract the value from UDT if the UDT does not support IConvertible. |
| UDT | Not Set | Set, but not relevant | Error in this case. Type name should always be set if the type is UDT. |
| UDT | Set | Value of Native type | This is an error case. We do not support native values for UDT typed parameters. Since the type is set to UDT, we require a UDT instance as value. No conversion is attempted. Call the serialization library. UdtTypeName is required in this case. |
| UDT | Set | Non Native | Works. Send the values as set. Do not verify that type details accurately describe the value, but send metadata to the server so it will do so. |

A UdtTypeName property can contain the 3-part name of a UDT as it is defined in the server. It should be specified when using UDT parameters. It should not be used with other types. The property may be expressed as follows:

public string UdtTypeName {get;}

A Value property may be expressed as follows:

public object Value {get; set;}

This property may retrieve or set the value for a parameter. For UDTs, the value can be the actual instance of the UDT. Note that SqlParameter may keep the reference to the type for reference-types. As a result, if the instance state is changed after setting it in the parameter but before calling any of the Execute methods on the command, those changes will be reflected on the value sent to the server. A different option to maintain more similar semantics with other types would be to serialize the UDT in the property setter.

SqlResultSet Class

A GetDataTypeName method in this class may be expressed as follows:
public string GetDataTypeName( int index)

When called on a UDT column, this method can return the 3-part name of the UDT. The throws for this method can be, for example, an IndexOutOfBoundsException: if "index" is less than 0 or greater than the number of columns in the result-set minus 1.

A GetFieldType method may be expressed as follows:
public Type GetFieldType( int index)

When called on a UDT column, this method may return a System.Type instance that represents the UDT type in the CLR type-system.

A GetSqlMetadata method may be expressed as follows:
public SqlMetaData GetSqlMetaData(int index)

This method may return metadata for the indicated column. It can work for all types. When used in UDTs, it returns a SqlMetaData instance that includes information about the UDT. It may have the following properties:

Method Parameters:
index: column number, 0-based

Return Value:
A SqlMetaData instance that describes the column

Throws:
IndexOutOfBoundsException: if "index" is less than 0 or greater than the number of columns in the result-set minus 1.

Additionally, the GetValue, GetSqlValue, GetValues, GetSqlValues, and Indexer methods are expressed as follows:
public object GetValue(int index)
public object GetSqlValue(int index)
public int GetValues(object[ ] values)
public int GetSqlValues(object[ ] values)
public object this[int index]
public object this[string columnName]

These methods may be modified so they can also return UDTs. When called on a UDT column, these methods may create a new UDT instance off the buffered bytes and return it to the caller.

Note that the created object need not be cached inside SqlClient, in which case each call results in a newly created instance. These methods can have the following exemplary properties.

Method Parameters:
index: column number, 0-based
columnName: the name of the column to get the UDT from Return Value:
A UDT instance. If the value is null, all these methods but GetSqlValue and GetSqlValues return DBNull.Value. GetSqlValue and GetSqlValues return the null instance of the UDT type (the value of the <udt>.Null property)

Throws:
IndexOutOfBoundsException: if "index" is less than 0 or greater than the number of columns in the result-set minus 1.
SerializationException [new]: if the serialization library fails to deserialize the UDT instance The SetValue, SetValues, Indexer (setter) methods are expressed as follows:
public void SetValue(int index, object value)
public int SetValues(object[ ] values)
public object this[int index]
public object this[string columnName]

These methods may be modified so they can also set UDT values. When called on a UDT column, these methods can set the new UDT instance as the value. They may have the following properties:

Method Parameters:
index: column number, 0-based
columnName: the name of the column to get the UDT from
value: the new UDT value for the column
values: an array of values that may include UDTs in one or more columns Return Value:
(SetValues only): the number of elements in values Throws:
IndexOutOfBoundsException: if "index" is less than 0 or greater than the number of columns in the result-set minus 1.
SerializationException [new]: if the serialization library fails to serialize the UDT instance Turning now to the functionality of the API, it may first be configured for assembly compatibility. SqlClient may always use regular .NET APIs for assembly loading (Assembly.Load). This means that SqlClient can follow the Common Language Runtime (CLR) assembly rules for loading assemblies. Furthermore, assembly names that are received as part of the UDT metadata from the server may contain parts such as name, version, culture and public key token. For example, an assembly that does not have a strong name will not have a public key token. Thus the invention can be configured for optimal flexibility.

Where parts of a UDT are missing, the missing parts need not be inferred. Instead, an AssemblyName object may be populated with the existing parts, leaving the other parts null. The CLR assembly rules can decide if there is a locally available assembly that matches the provided name.

The API may also be configured for type compatibility. Once SqlClient detects that the assembly on the client and server are compatible, it should to verify whether the types are actually compatible. Note that type compatibility is technically orthogonal to assembly compatibility because a user could make incompatible changes to a type but keep the same assembly version number. Type-level compatibility may be handled differently depending on the serialization format.

Next, the API can be configured for compatibility for native serialization. To do type compatibility verification, an exception may be thrown if the types are not compatible.

Further, the API can be configured for CommandBuilder integration and conflict detection. The command-builder default behavior when generating update statements is to compare all the original values with the values currently in the database to detect any update conflicts.

Comparison using the "=" operator in SQL is may be supported for only a subset of UDTs, namely those with IsByteOrdered=true. The command builder can generate SQL statements as if the "=" operator was always supported. If comparison is not supported for a particular UDT, then the server may generate an error and it can be exposed back in the client.

UDT metadata may be surfaced through SqlDataReader.GetSchemaTable as a single column, "DataTypeName", which contains the assembly-qualified type name of the UDT. This name fully describes the type and can be used in Type.GetType( ).

The "DataType" column may contain the actual type instance. Note that this column may be null if the type is not available to the calling AppDomain. The same applies to the return value of the call to SqlDataReader.GetFieldType( ).

Late binding and assembly download can be supported. When applications are early bound to the CLR types used as UDTs, the assemblies that contain them are deployed along with the rest of the application on the client computer. When a UDT instance is needed (i.e., for a result-set or a parameter), it is created from that type. Care must be taken to ensure that client and server versions of the assemblies are in sync.

A different scenario arises when the application does not have an explicit reference to the types representing UDTs on the server. In this case, the client-side UDT infrastructure first tries to load the assembly from the local system. If the assembly is not present it can be downloaded from the server. Note that the assembly binary may be just another field in one of the catalog tables.

The invention may be configured to handle out-of-sync conditions should they arise. Each time a result-set containing one or more UDTs is returned from the server, its associated metadata may be returned with it, including the UDT assembly names and/or an MVID. By exchanging MVID's between client and server, some flexibility may be lost, so it may be useful to do so only where client and server versions of a component must be fully in sync. This can be compared with the locally cached version to verify that assemblies are still compatible.

If the comparison shows that assemblies have changed, action can be required by the client UDT infrastructure. If the assembly was already locally installed in the client, no download need be attempted and an exception can be thrown. For UDTs from dynamically downloaded assemblies, the new assembly may be downloaded and instances created from it.

Assembly caching is another feature that may be provided. In such embodiments, assemblies may be downloaded on-demand from the server. Once downloaded, they are kept on a client cache to avoid the overhead of downloading it every time a UDT has to be instantiated. Also, by reusing the same assembly instance type identity is preserved across different instances of a UDT.

Assemblies can be cached on a per-connection string base. If different assemblies for different users within a single database are supported, separate caches for each different user identity may be necessary. The cache may also be per-AppDomain. These assemblies need not be persisted to disk.

Embodiments can support code-access security by restricting the use of UDTs by partially-trusted callers. Fully-trusted callers may always be allowed to use UDTs. However, if the caller is partially trusted, then the system can be configured such that only UDTs contained in assemblies marked with [AllowPartiallyTrustedCallersAttribute] or the like will work.

Furthermore, in order to create an instance of the UDT, SqlClient can use reflection. In that case, a permission granting system can be used inside the serialization/deserialization code. This way, the caller does not need reflection permissions to use UDTs.

Security for downloading assemblies can also be implemented with the invention. In one embodiment, Code Access Security (CAS) may be used to indicate whether assemblies can be dynamically downloaded. However, this model need not restrict assembly download in fully trusted scenarios. The use of a broader type system such as CLR types for describing non-native data types such as UDTs has many advantages, but it can introduce an additional complexity to the deployment of applications that use the feature: the assembly containing the UDT may be needed in the client computer and accessible to the calling AppDomain in order for the client to be able to return instances of that UDT.

Since the server may maintain the assembly itself (that is, the files that make up the assembly) in its metadata tables, it is possible to dynamically obtain it from the client. This fact can be leveraged during value fetching. The client can detect that a given UDT is not available on the client and use the UDT metadata sent by the server to go back to the server and obtain the actual assembly. Once the assembly is on the client it can be dynamically loaded in memory and instances of its contained types can be created. This greatly simplifies the deployment model for UDTs by providing transparent type binding, regardless of whether the type was originally available to the client or not.

Another model is simpler, and provides for the use of a connection string keyword. This model allows a default setting to "never download code," thereby providing enhanced security. Additionally, since users/administrators can indicate which connection strings are valid by using CAS attributes such as SqlClientPermission, CAS support may be maintained in an indirect manner.

If the clients accessing a database are themselves built on top of the .NET Framework and the CLR, such as the API described in the section above, the invention can provide seamless end-to-end integration. This is because in such embodiments the type-system used to define UDTs is the same as the type-system used to model the rest of the calling application and the data-access API itself. In cases where the clients are modeled using other technologies it may be difficult to expose original objects that require the CLR, but some level of exposure is still available.

Another aspect of the invention involves the metadata exchange between client and server. When all the types that can be exchanged between the client and the server are known at design-time, the client-server metadata protocol can be greatly simplified. With the introduction of UDTs, the metadata-related parts of a client-server protocol may be extended to support identification of arbitrary CLR types.

This can be achieved by using the CLR naming convention for types. When sending metadata about UDTs, the sending party can send an "assembly-qualified: type name", which fully identifies the assembly that contains the UDT, and the type within the assembly. This can be used by the other end to locate the assembly and type and either extract more metadata from the type or create instances of it.

Clients can also send to the server the "sysname" which is the type-name in the database namespace, instead of the CLR namespace. This is useful when the UDT needs to be referenced in a T-SQL statement where CLR names are not currently supported.

The use of a general purpose naming scheme, such as CLR type names, allows for sophisticated scenarios such as compound types. For example, if a type is an instantiation of a generic type such as List<Person> (in C# syntax), then the metadata should describe multiple types and their relationship. In the example above, it should fully describe two types (List and Person) and their corresponding containing assemblies, and also their relationship (Person is the first parametric type of List). The CLR type name syntax fully supports this.

In some embodiments, the metadata parts of the client-server protocol may be exchanged names that are defined in the database namespace—3-part names. Such names are specific to the database and may be different for the same UDT in different servers or in different databases on the same server. This approach uses multiple round-trips between the client and the server to resolve the type identity of every UDT during metadata resolution. Embodiments that use assembly-qualified type names directly in the metadata eliminate that indirection and avoid multiple round-trips, as well as several other functional and performance-related pitfalls.

Techniques for serializing and deserializing non-native data type may also be employed in embodiments of the invention. In order to store instances of UDTs in a server as well as to transfer them between a client and the server, those instances may be serialized into raw bytes and the deserialized back into instances. The design provided herein supports multiple serialization models that are geared towards different application needs and scenarios.

Two exemplary serialization formats are "native" and "user-defined". Native serialization supports a relatively small set of types: only those that are made of value-types only, with every member also being a value-type recursively. This serialization is fast and requires no work from the UDT author. This format may comprise several sub-formats that are picked based on certain characteristics of the type. In preferred embodiments, however, a single format is used that covers all the supported UDT types for 'native'.

User-defined serialization allows for a broader set of types. With user-defined serialization there are no restrictions on the contents of the type itself, as long as the type author can provide a serialized version of it. In this case type-authors may implement their own serialization and deserialization code which will be called by both the client and the server as needed.

On the client API, whenever users use a getter (e.g., SqlDataReader.GetValue), SqlClient or an analogous API class may take the serialized bytes of the UDT and use a serialization library to turn them back into a UDT instance, which is turn will be returned to the caller. The same process will happen when values of output parameters are accessed through the client API.

In the case of input-parameters, the opposite process may take place. The users can provide instances of UDTs in the value property of the parameter object. The client library may then work in conjunction with the serialization library to serialize the instance into bytes, which may then be sent over the wire to the server during command execution.

In order to maintain purity of data in the boundaries of the server, it is desirable to have the capability of validating every UDT instance that's entering the server. User-defined types represent instances of objects that can have complex structure, so any arbitrary set of bytes cannot be mapped to an instance of a given type. UDTs can optionally provide a validation method, in the form of a method in the type itself, that the server will invoke post-serialization to verify that the UDT has values within the valid ranges and meeting whatever relationship the UDT might need to enforce. This allows UDTs to validate themselves before they are used inside a database or persistently stored.

It should be emphasized that the invention may be implemented in connection with any computing environment, such as in a single computer, in a large and complex network, or in a distributed computing environment. Still further, the present invention may be implemented in or across a plurality of processing chips or devices, and storage may similarly be effected across a plurality of devices. Such devices might include personal computers, network servers, database servers, handheld devices, supercomputers, or computers integrated into other systems such as automobiles and airplanes. Therefore, the present invention should not be limited to any single embodiment, but rather should be construed in breadth and scope in accordance with the appended claims.

We claim:

1. A method for exchanging at least one User Defined Type (UDT) instance between a database and a client, wherein the client requests said UDT instance by calling a database application programming interface (API), said method comprising:
   receiving by said API a client request for at least one UDT instance, wherein said UDT instance conforms to a Common Language Runtime (CLR) type system shared by said database and said client;
   said API requesting said UDT instance from said database;
   receiving by the API metadata from said database, said metadata referencing a UDT in a client type library;
   receiving by the API said UDT instance in a serialized form from said database;
   said API looking up UDT deserialization information;
   deserializing by the API the UDT instance using said deserialization information; and
   said API providing said UDT instance to said client.

2. The method of claim 1, further comprising requesting by the API a client type library for said UDT instance.

3. The method of claim 1, wherein said UDT comprises information for validating that the serialized UDT instance does not contain unexpected data.

4. The method of claim 1, wherein said deserialization information comprises at least one custom serialization format corresponding to said at least one UDT instance.

5. The method of claim 1, wherein said UDT further comprises information for communicating whether the at least one UDT instance has changed.

6. A computer system comprising means for exchanging at least one User Defined Type (UDT) instance between the computer system and a database, comprising:
   means for receiving a request for the at least one UDT instance, wherein said UDT instance conforms to a Common Language Runtime (CLR) type system shared by said database and said computer system;
   means for requesting said UDT instance from said database;
   means for receiving metadata from said database, said metadata referencing a UDT in a client type library;
   means for receiving said UDT instance in a serialized form from said database;
   means for looking up UDT deserialization information;
   means for deserializing the UDT instance using said deserialization information; and
   means for providing said UDT instance to said client.

7. The computer system of claim 6, further comprising means for requesting a client type library for said UDT instance.

8. The computer system of claim 6, wherein said UDT comprises information for validating that the serialized UDT instance does not contain unexpected data.

9. The computer system of claim 6, wherein the deserialization information comprises at least one custom serialization format corresponding to said at least one UDT instance.

10. A computer readable storage medium bearing instructions for exchanging at least one User Defined Type (UDT) instance between a database and a client, comprising:

instructions for receiving a request for the at least one UDT instance, wherein said UDT instance conforms to a Common Language Runtime (CLR) type system shared by said database and said client;

instructions for requesting said UDT instance from said database;

instructions for receiving metadata from said database, said metadata referencing a UDT in a client type library;

instructions for receiving a serialized instance of the UDT instance from said database;

instructions for looking up UDT deserialization information;

instructions for deserializing the UDT instance using said deserialization information; and instructions for providing said UDT instance to said client.

11. The computer readable storage medium of claim 10, further comprising instructions for requesting a client type library for said UDT instance.

12. The computer readable storage medium of claim 10, wherein said UDT comprises information for validating that the serialized UDT instance does not contain unexpected data.

13. The computer readable storage medium of claim 10, wherein the deserialization information comprises at least one custom serialization format corresponding to said at least one UDT instance.

14. The computer readable storage medium of claim 10, wherein said UDT further comprises information for communicating whether the at least one UDT instance has changed.

* * * * *